United States Patent [19]

Takefuta et al.

[11] 4,225,027
[45] Sep. 30, 1980

[54] ELECTROMAGNETIC SPRING-WOUND CLUTCH

[75] Inventors: Hideyasu Takefuta; Kohki Iwata; Toshio Yamaguchi, all of Higashi Matsuyama, Japan

[73] Assignee: Diesel Kiki Co., Ltd., Tokyo, Japan

[21] Appl. No.: 942,262

[22] Filed: Sep. 14, 1978

[30] Foreign Application Priority Data

Sep. 28, 1977 [JP] Japan .............................. 52-129241
Nov. 9, 1977 [JP] Japan .............................. 52-149377

[51] Int. Cl.² ...................... F16D 27/10; F16D 13/08
[52] U.S. Cl. .................................. 192/84 T; 192/35; 192/81 C
[58] Field of Search ...................... 192/35, 41 S, 81 C, 192/84 T

[56] References Cited

U.S. PATENT DOCUMENTS

| | | | |
|---|---|---|---|
| 2,566,539 | 9/1951 | Starkey | 192/81 C |
| 3,095,071 | 6/1963 | Mason | 192/84 T X |
| 3,171,523 | 3/1965 | Shoquist | 192/84 T X |
| 3,185,899 | 5/1965 | Skelton, Jr. | 192/84 T X |
| 3,224,536 | 12/1965 | Mason | 192/84 T X |
| 3,735,847 | 5/1973 | Brucken | 192/84 T X |

Primary Examiner—Allan D. Herrmann
Attorney, Agent, or Firm—David G. Alexander

[57] ABSTRACT

Rotary input and output members (19), (28) are axially aligned with each other and a rotary clutch disc (32) is axially aligned with and frictionally engageable with the input member (19). A coil-wound spring (33) is wound around the input and output members (19), (28) and connected at its ends to the clutch disc (32) and output member (28) respectively. An electromagnetic coil (26), which energized, attracts the clutch disc (32) into frictional engagement with the input member (19) and causes the coil-wound spring (33) to tightly wind around and embrace the input and output members (19), (28), thereby drivingly connecting the same together. A sleeve (41) formed with a circumferential gap (41a) is disposed between the coil-wound spring (33) and the input member (19) which provides the clutch (11) with a desirable amount of slippage prior to full engagement, evenly distributes the radially inward force applied to the input and output members (19), (28) by the coil-wound spring (33) and prevents the coil-wound spring (33) from entering an axial space (42) between the input and output members (19), (28).

5 Claims, 9 Drawing Figures

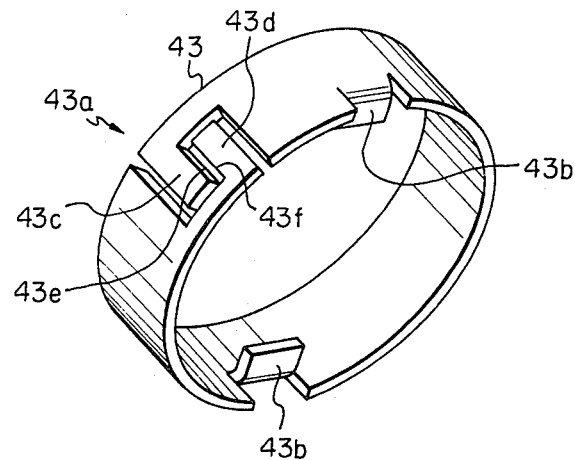
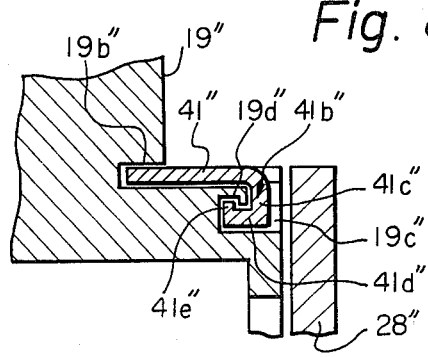
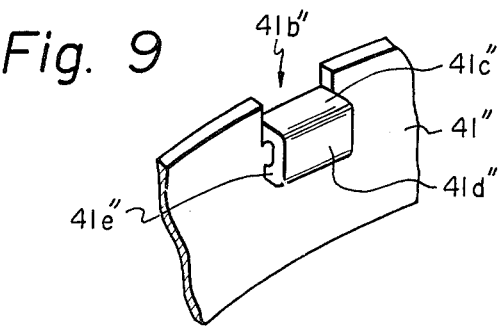

ELECTROMAGNETIC SPRING-WOUND CLUTCH

BACKGROUND OF THE INVENTION

The present invention relates to an improved electromagnetic spring-wound clutch which may be advantageously employed to connect an air conditioning compressor to an engine of an automotive vehicle. This invention constitutes a novel and advantageous improvement to an ELECTROMAGNETIC SPRING-WOUND CLUTCH disclosed in copending U.S. patent application Ser. Nos. 866,645, filed Jan. 3, 1978 and 917,316, filed June 19, 1978, which are assigned to the same assignee as this application.

An electromagnetic spring-wound clutch of the general type to which the present invention relates is disclosed in U.S. Pat. No. 3,735,847 and comprises coaxial input and output members. A clutch disc is rotatably provided on the input member. Furthermore, a coil-wound spring is wound around the input and output members and connected at its opposite ends to the clutch disc and output member. An electromagnetic coil attracts the clutch disc into frictional engagement with the input member, causing the coil-wound spring to be tightly wound around the input and output members and drivably connect the input member to the output member. When the coil is de-energized, the clutch disc disengages from the input member, and the coil-wound spring releases the input member for rotation relative to the output member.

The clutch further comprises a generally tubular cover which protectively surrounds the coil-wound spring. With the coil de-energized, the coil-wound spring radially expands due to its own force into engagement with the inner surface of the cover. Furthermore, a spring means urges the clutch disc away from the input member and into engagement with the cover when the coil is de-energized.

Although the spring-wound clutch as disclosed in the prior art is generally effective and advantageous, it suffers from several problems which have heretofore remained unsolved. As a practical design consideration, an axial gap must be provided between the input and output members. The coil-wound spring, as it winds around the input and output members to engage the clutch, tends to partially enter the gap between the input and output members. As a result, the edges of the coil-wound spring scratch against the end faces of the input and output members causing wear and rough engagement of the clutch. Eventually, the impact load at clutch engagement increases to an unacceptable extent, resulting in extremely abrupt engagement.

In order to prevent excessive impact load and unpleasant noise at engagement, a certain amount of slippage of the output member relative to the input member must occur. However, in the spring-wound clutch developed thus far, the coil-wound spring tends to tightly embrace the input and output members in an almost instantaneous manner when the coil is energized. Generally, relative slippage should occur for 40-60 ms after energization of the coil to avoid undesirable abrupt vehicle speed changes. To provide 50 ms of slippage at 3000 rpm, a relative slippage of about 2.5 revolutions is required. However, it has been impossible to provide such an optimum amount of slippage in the electromagnetic spring-wound clutch at its state of development heretofore.

SUMMARY OF THE INVENTION

In accordance with the present invention, an electromagnetic spring-wound clutch includes a rotary input member, a rotary output member axially aligned with the input member and a rotary clutch disc axially aligned with the input member and frictionally engageable therewith. A coil-wound spring is wound around the input member and output member and connected at its ends to the clutch disc and output member respectively. An electromagnetic coil, when energized, attracts the clutch disc into frictional engagement with the input member. A resilient sleeve is coaxially and rotatably disposed between the coil-wound spring and the input member and is formed with a circumferential gap.

It is an object of the present invention to provide an improved electromagnetic spring-wound clutch having a substantially reduced impact load at engagement compared to the prior art.

It is another object of the present invention to provide an electromagnetic spring-wound clutch comprising means for preventing a coil-wound spring from entering an axial gap between an input member and an output member.

It is another object of the present invention to provide an electromagnetic spring-wound clutch comprising means for evenly distributing a radially inward force applied to input and output members by a coil-wound spring.

It is another object of the present invention to eliminate a requirement for precise machining in an electromagnetic spring-wound clutch and generally reduce cost and manufacturing complexity.

It is another object of the present invention to provide a generally improved electromagnetic spring-wound clutch.

Other objects, together with the foregoing, are attained in the embodiments described in the following description and illustrated in the accompanying drawing.

BRIEF DESCRIPTION OF THE DRAWING

FIG. 7 is a perspective view of a modification of the sleeve;

FIG. 8 is an enlarged sectional view showing yet another modification of the sleeve; and FIG. 9 is a fragmentary perspective view further illustrating the modified sleeve configuration of FIG. 8.

DESCRIPTION OF THE PREFERRED EMBODIMENTS

While the electromagnetic spring-wound clutch of the present invention is susceptible of numerous physical embodiments, depending upon the environment and requirements of use, substantial numbers of the herein shown and described embodiments have been made, tested and used, and all have performed in an eminently satisfactory manner.

Figure 1:
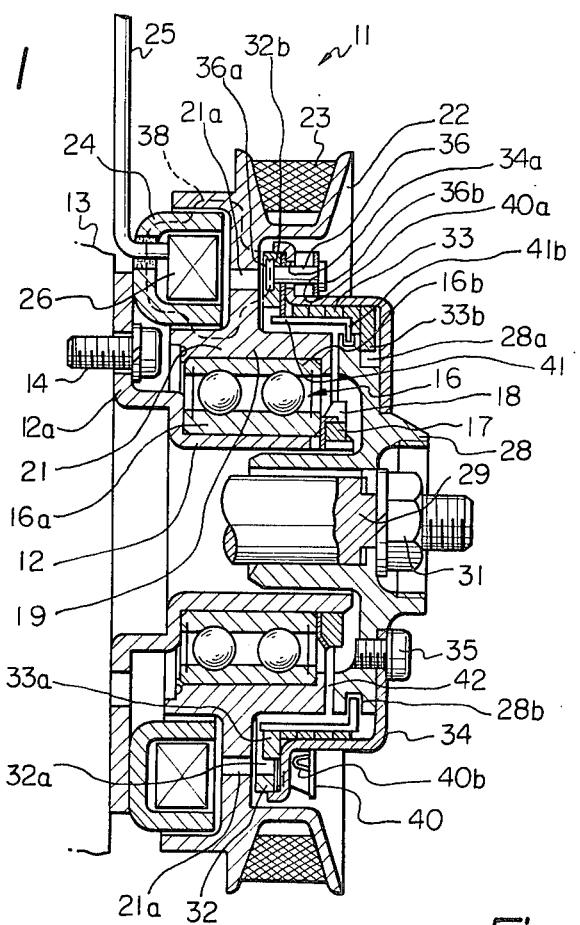
FIG. 1 is a longitudinal sectional view of an electromagnetic spring-wound clutch embodying the present invention.

Referring now to FIG. 1 of the drawing, an electromagnetic spring-wound clutch embodying the present invention is generally designated as 11 and comprises a tubular hub 12 which is rigidly mounted to a compressor 13 of an air conditioning system for an automotive vehicle (not shown) by means of a flange 12a of the hub 12 and bolts 14. An inner race 16a of a ball bearing 16 is fitted over the hub 12 and is rigidly held in place by means of a nut 17 screwed onto a threaded right end portion of the hub 12 and an intervening lock washer 18. A tubular input member 19 is tightly fit onto an outer race 16b of the bearing 16 and rigidly held in place by means of a reduced diameter right shoulder and a left end of the input member 19, the latter being crimped over the left end of the outer race 16b. An annular member 21 having a hollow cross-section is integral with the input member 19. The left wall of the annular member 21 is cut away, and a plurality of circumferentially spaced, arcuate slots 21a are formed through the right wall of the annular member 21. A pulley 22 is integral with the annular member 21 and connected to an engine of the automotive vehicle (not shown) through a V-belt 23.

Another annular member 24 is welded to the flange 12a of the hub 12 and fits inside the hollow of the annular member 21 without touching the same. The right wall of the annular member 24 is cut away. Rigidly mounted inside the annular member 24 is an electromagnetic coil 26 which may be energized through a lead 25.

A generally tubular output member 28 is rotatably supported inside the hub 12. An output shaft 29 is threaded at its right end and rigidly fixed to the output member 28 by means of a nut 31 and conjugate shoulders of the shaft 29 and output member 28. The output shaft 29 is constituted by a drive shaft of the compressor 13, although the connection is not shown in detail.

An annular clutch disc 32 is rotatably provided around the input member 19. A coil-wound spring 33 is wound around the input and output members 19 and 28 in such a manner as to be radially spaced therefrom in its free state. One end of the spring 33 is connected to the clutch disc 32 by means of a radially outwardly extending tab 33a of the spring 33 which fits in a slot 32a formed in the inner circumference of the clutch disc 32. The other end of the spring 33 is connected to the output member 28 by means of a radially inwardly extending tab 33b of the spring 33 which fits in a slot 28a formed in the outer circumference of the output member 28. The clutch 11 further comprises a cover 34 which is firmly attached to the output member 28 by bolts 35. The cover 34 encloses the coil-wound spring 33 and extends partially around the clutch disc 32.

A plurality (3 or more) of arcuate slots 34a are formed through the outer portion of the cover 34 which faces the clutch disc 32, although only one slot 34a is visible in the drawing. A pin 36 having left and right heads 36a and 36b respectively slidably extends through each slot 34a, the diameter of the pin 36 being substantially the same as that of the slot 34a. Conjugate to the slots 34a, circumferential spaced holes 32b are formed through the clutch disc 32. Each hole 32b comprises a small portion having a width equal to the diameter of the pin 36 and a large portion having a width greater than a diameter of the left head 36a of the pin 36. A generally annular spring 40 is formed with holes 40a through which the pins 36 extend. The spring 40 is fitted over the cover 34 as shown. The spring 40 is made of spring steel and provided by press forming or the like with resilient axial projections 40b which engage the cover 34 in a resiliently deformed state and urge the pins 36 and thereby the clutch disc 32 rightwardly. In this state, the clutch disc 32 is spaced from the annular member 21. The clutch disc 32 is supported by the pins 36 and guided thereby for axial movement in parallelism with the annular member 21.

The integral input member 19, annular member 21 and pulley 22 are mutually coaxial and are driven by the V-belt 23. The output member 28, output shaft 29 and cover 34 are also mutually coaxial and rotate as a unit.

With the coil 26 de-energized, the spring 40 urges the clutch disc 32 out of engagement with the annular member 21 and toward engagement with the cover 34. The coil-wound spring 33 radially expands so as to be clear of the input member 19. The annular member 21 rotates relative to the clutch disc 32, which remains stationary. There is no driving connection between the pulley 22 and output shaft 29, and the output shaft 29 remains stationary.

To engage the clutch 11 and drive the compressor 13 from the pulley 22 by means of the output shaft 29, the coil 26 is energized with electric current. A magnetic circuit is established from the coil 26 through the slots 21a of the annular member 21 and the clutch disc 32 indicated by a phantom line curve 38 in FIG. 1. This attracts the clutch disc 32 leftwardly into frictional engagement with the annular member 21 against the force of the spring 40. The clutch disc 32 rotates with the annular member 21, winding the coil-wound spring 33 tightly around the input and output members 19 and 28. Due to the provision of the tabs 33a and 33b and slots 32a and 28a, the output member 28 is drivingly connected to the input member 19 through the clutch disc 32 and spring 33. The pulley 22, output shaft 29 and intervening components rotate as a unit, driving the compressor 13 from the engine. The rotational movement of the clutch disc 32 relative to the cover 34 necessary for winding the coil-wound spring 33 around the input member 19 is made possible by the slots 34a in the cover 34.

To disengage the clutch 11, the coil 26 is de-energized, thereby removing the magnetic attractive force from the clutch disc 32. The spring 40 immediately and smoothly moves the clutch disc 32 away from the annular member 21 and toward abutting engagement with the cover 34.

It will be noted that the clutch disc 32 is maintained parallel to the annular member 21 by the pins 36, and thereby engages and disengages the annular member 21 in a completely smooth manner.

Although only one coil-wound spring 33 is shown and illustrated, it will be understood by those skilled in the art that two intertwined coil-wound springs may be provided.

Figure 2:
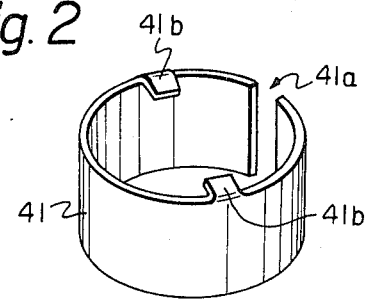
FIG. 2 is a perspective view of a resilient sleeve of the present clutch.
Figure 3:
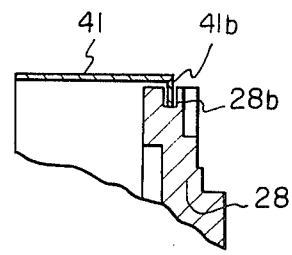
FIG. 3 is an enlarged sectional view of part of the clutch and sleeve.

In accordance with an important feature of the present invention, as best illustrated in FIGS. 2 and 3, the clutch 11 further comprises a resilient sleeve 41 made of stainless steel, spring steel or the like. The sleeve 41 is coaxially and rotatably disposed between the coil-wound spring 33 and the input and output members 19 and 28 respectively. In the embodiment illustrated in FIGS. 1 to 3, the radially outermost portions of the input and output members 19 and 28 around which the coil-wound spring 33 is wound have a circular profile and the same outer diameter. The sleeve 41 is urged, with the coil 26 de-energized, due to its own resilience, radially outwardly into light engagement with the radially inner surface of the coil-wound spring 33.

As clearly shown in FIG. 2 the sleeve 41 is formed with a circumferential gap 41a which allows the sleeve 41 to radially expand and contract as will become clear from further description. The sleeve 41 is further formed with inwardly extending tabs 41b which fit into a circumferential groove 28b formed in the outer periphery of the output member 28. The arrangement of the tabs 41b and groove 28b prevent the sleeve 41 from moving axially.

It will be noted that, as a practical design necessity, an axial gap 42 must be provided between the input and output members 19 and 28. In the prior art, the coil wound spring 33 intrudes into this gap 42 to abrade the end faces of the input and output members 19 and 28 and cause rough engagement of the clutch. However, the sleeve 41 positively prevents this phenomenon and ensures smooth clutch engagement.

When the coil 26 is energized, the coil-wound spring 33 radially contracts and progressively embraces the sleeve 41. Due to the provision of the gap 41a, the sleeve 41 radially contracts around the input and output members 19 and 28, progressively applying pressure thereto. It will be noted that since the sleeve 41 intercedes between the coil-wound spring 33 and the input and output members 19 and 28 it positively prevents the coil-wound spring 33 from intruding into the gap 42. Furthermore, the sleeve 41, due to its relatively large surface area, evenly distributes the radially inward pressure applied to the input and output members 19 and 28 by the coil-wound spring 33. After the coil-wound spring 33 has contracted to such an extent that the sleeve 41 is tightly compressed around the input and output members 19 and 28, driving connection is established between the input and output members 19 and 28 through the sleeve 41 and coil-wound spring 33.

As yet another advantage of the present clutch 11, since the sleeve 41 is rotatably disposed around the input and output members 19 and 28, it rotatably slips therearound during contraction of the coil-wound spring 33. This provides the slippage required for smooth clutch engagement and low impact load.

Figure 4:
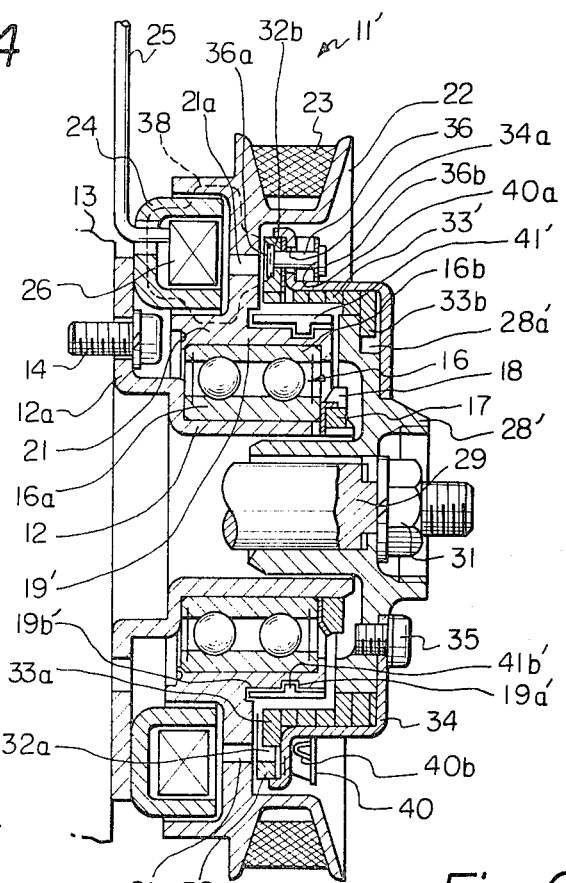
FIG. 4 is similar to FIG. 1 but shows a second embodiment of the present invention.
Figure 5:
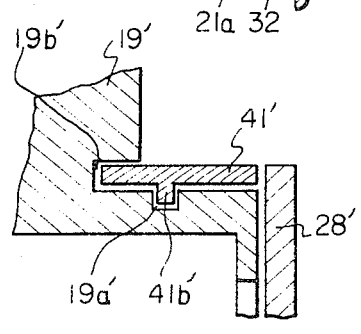
FIG. 5 is an enlarged sectional view showing part of the embodiment of FIG. 4.
Figure 6:
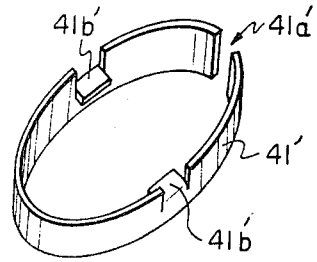
FIG. 6 is a perspective view of a resilient sleeve of the embodiment of FIG. 4.

FIGS. 4 to 6 illustrate another embodiment of the present invention in which like elements are designated by the same reference numerals and corresponding but modified elements are designated by the same reference numerals primed.

In a clutch 11' the outer diameter of an input member 19' is selected to be smaller than the outer diameter of an output member 28' by an amount equal to twice the thickness of a resilient sleeve 41'. In this embodiment the sleeve 41' contacts due to its own resilience to snugly but rotatably fit over only the input member 19'. Thus, the outer diameter of the combination of the input member 19' and the sleeve 41' is equal to the outer diameter of the output member 28'.

The sleeve 41' is formed with radially inwardly extending tabs 41b' which fit in a circumferential groove 19a' formed in the outer periphery of the input member 19'. This arrangement prevents axial movement of the sleeve 41'. However, if the width of the groove 19a' is made larger than the thickness of the tabs 41b', the sleeve 41' may be made axially movable within a predetermined range. The input member 19' is further formed with a radial groove 19b' in which the left edge of the sleeve 41' fits.

As yet another point of difference between the clutches 11 and 11', it will be noted that the right portion of a coil-wound spring 33' which surrounds the output member 28' is tightly wound therearound even when the coil 26 is de-energized. However, the left portion of the spring 33' which surrounds the input member 19' is radially spaced therefrom and lightly engages the inner surface of the cover 34.

When the coil 26 is energized, the clutch disc 32 is attracted into engagement with the annular member 21 in the same manner as in the clutch 11. However, in this case, the coil-wound spring 33' only contracts into tight embracement with the input member 19' through the sleeve 41' since the spring 33' is already contracted around the output member 28'. The operation of the clutch 11' is otherwise the same as for the clutch 11 except that the sleeve 41' radially contracts by only a small amount to tightly grip the input member 19'.

FIG. 7 illustrates another resilient sleeve 43 which may directly replace the sleeve 41'. The sleeve 43 is formed with a circumferential gap 43a and tabs 43b in the same manner as the sleeve 41'. However, the sleeve 43 is additionally formed with a pair of interlocking, L-shaped tabs 43c and 43d which extend into the gap 43a from the opposite circumferential ends of the sleeve 43 respectively.

The sleeve 43 is normally rotatably disposed around the input member 19' in the manner illustrated with the tabs 43c and 43d disengaged. However, during high speed operation of the clutch 11' the sleeve 43 tends to expand radially due to centrifugal force and thereby tends to disengage the clutch 11'. This is prevented by the tabs 43c and 43d which limit the radially outward movement of the sleeve 43. More specifically, upon slight radial expansion of the sleeve 43, adjacent edges 43e and 43f of the tabs 43c and 43d respectively abut against each other rendering the sleeve 43 substantially rigid. In this manner, further radial expansion is prevented.

FIGS. 8 and 9 illustrate yet another sleeve 41" embodying the present invention. Corresponding but modified elements are designated by the same reference numerals double primed.

In FIGS. 8 and 9 an input member 19" is formed with a radial groove 19c". A circumferential groove 19d" is formed in the radially inner wall of the groove 19c". The sleeve 41" is formed with a circumferential gap (not shown) and tabs 41b". Each tab 41b" comprises a radially inwardly extending portion 41c", an axially inwardly extending portion 41d" and a radially outwardly extending portion 41e". The axially inwardly extending portions 41d" of the tabs 41b " fit in the radial groove 19c" of the input member 19", and serve to limit radial expansion of the sleeve 41" through abutment with the radially inner wall of the groove 19c". The radially outwardly extending portions 41e" of the tabs 41b" fit in the radial groove 19d" of the input member 19" and prevent axial movement of the sleeve 41". If desired, the width of the groove 19d" may be made larger than the thickness of the portion 41e" to permit axial movement of the sleeve 41" within a predetermined range. The sleeve 41" is rotatably disposed on the input member 19" and generally functions in the same manner as the sleeve 41'.

The left edges of the sleeves 41' and 41" fit in the radial grooves 19b' and 19b" respectively. This arrangement contributes to limiting radial expansion of the sleeves 41' and 41".

In summary, it will be seen that the present invention prevents abrasion of input and output members in a spring-wound clutch and furthermore substantially reduces the impact load upon engagement by providing a desirable amount of slippage. It will be noted that it is not necessary to precisely machine the input and output members to provide a predetermined axial gap therebetween as is necessary in the prior art, and the manufacture of the clutch is thereby simplified. Various modifications will become possible for those skilled in the art after receiving the teachings of the present disclosure without departing from the scope thereof. For example, the resilient sleeves illustrated in the various Figures of drawing may be provided with more than two inwardly extending tabs, or a continuous inwardly extending ring, in accordance with the present invention.

What is claimed is:

1. An electromagnetic spring-wound clutch including a rotary input member, a rotary output member coaxial with the input member, a rotary clutch disc axially aligned with the input member and frictionally engageable therewith, a coil-wound spring wound around the input member and output member and being connected at its ends to the clutch disc and output member respectively and an electromagnetic coil which, when energized, attracts the clutch disc into frictional engagement with the input member, characterized by comprising:

a resilient sleeve coaxially and rotatably disposed between the coil-wound spring and the input member, the sleeve being formed with a circumferential gap;

the input member being formed with a circumferential groove, the sleeve being formed with a tab which fits in the groove.

2. An electromagnetic spring-wound clutch including a rotary input member, a rotary output member coaxial with the input member, a rotary clutch disc axially aligned with the input member and frictionally engageable therewith, a coil-wound spring wound around the input member and output member and being connected at its ends to the clutch disc and output member respectively and an electromagnetic coil which, when energized, attracts the clutch disc into frictional engagement with the input member, characterized by comprising:

a resilient sleeve coaxially and rotatably disposed between the coil-wound spring and the input member, the sleeve being formed with a circumferential gap;

the output member being formed with a circumferential groove, the sleeve being formed with a tab which fits in the groove.

3. An electromagnetic spring-wound clutch including a rotary input member, a rotary output member coaxial with the input member, a rotary clutch disc axially aligned with the input member and frictionally engageable therewith, a coil-wound spring wound around the input member and output member and being connected at its ends to the clutch disc and output member respectively and an electromagnetic coil which, when energized, attracts the clutch disc into frictional engagement with the input member, characterized by comprising:

a resilient sleeve coaxially and rotatably disposed between the coil-wound spring and the input member, the sleeve being formed with a circumferential gap;

the clutch further comprising means for limiting radially outward movement of the sleeve, said means comprising a pair of interlocking L-shaped tabs extending from opposite circumferential ends of the sleeve into the gap.

4. An electromagnetic spring-wound clutch including a rotary input member, a rotary output member coaxial with the input member, a rotary clutch disc axially aligned with the input member and frictionally engageable therewith, a coil-wound spring wound around the input member and output member and being connected at its ends to the clutch disc and output member respectively and an electromagnetic coil which, when energized, attracts the clutch disc into frictional engagement with the input member, characterized by comprising:

a resilient sleeve coaxially and rotatably disposed between the coil-wound spring and the input member, the sleeve being formed with a circumferential gap;

the input member being formed with a radial groove, the sleeve being formed with a tab which fits in the groove.

5. An electromagnetic spring-wound clutch including a rotary input member, a rotary output member coaxial with the input member, a rotary clutch disc axially aligned with the input member and frictionally engageable therewith, a coil-wound spring wound around the input member and output member and being connected at its ends to the clutch disc and output member respectively and an electromagnetic coil which, when energized, attracts the clutch disc into frictional engagement with the input member, characterized by comprising:

a resilient sleeve coaxially and rotatably disposed between the coil-wound spring and the input member, the sleeve being formed with a circumferential gap;

the input member being formed with a radial groove, an edge of the sleeve fitting in the groove.

* * * * *